(12) United States Patent
Ashcom et al.

(10) Patent No.: US 10,794,819 B2
(45) Date of Patent: Oct. 6, 2020

(54) WIDE FIELD OF VIEW NARROWBAND IMAGING FILTER TECHNOLOGY

(71) Applicant: Massachusetts Institute of Technology, Cambridge, MA (US)

(72) Inventors: Jonathan Ashcom, Cambridge, MA (US); Sumanth Kaushik, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 29 days.

(21) Appl. No.: 16/152,809

(22) Filed: Oct. 5, 2018

(65) Prior Publication Data

US 2020/0110023 A1    Apr. 9, 2020

(51) Int. Cl.
| | |
|---|---|
| *G01N 21/25* | (2006.01) |
| *G02B 27/10* | (2006.01) |
| *G01J 3/45* | (2006.01) |
| *G01N 21/3504* | (2014.01) |
| *G01J 3/28* | (2006.01) |

(52) U.S. Cl.
CPC .......... *G01N 21/255* (2013.01); *G01J 3/2823* (2013.01); *G01J 3/45* (2013.01); *G01N 21/3504* (2013.01); *G02B 27/106* (2013.01)

(58) Field of Classification Search
CPC ..... G01N 21/255; G01N 21/3504; G01J 3/45; G01J 3/2823; G02B 27/1006; G02B 27/106

See application file for complete search history.

(56) References Cited

U.S. PATENT DOCUMENTS

| | | | | |
|---|---|---|---|---|
| 3,825,347 A | * | 7/1974 | Kaiser .................. | G01N 21/255 356/451 |
| 5,168,325 A | * | 12/1992 | Yoder-Short .......... | G01N 21/45 356/36 |
| 6,665,075 B2 | * | 12/2003 | Mittleman ............. | G01N 21/49 356/450 |
| 2010/0328648 A1 | * | 12/2010 | Harrison ................... | G01J 3/02 356/51 |
| 2012/0002212 A1 | * | 1/2012 | Chandler ............... | G01N 21/31 356/454 |

(Continued)

OTHER PUBLICATIONS

Griffin et al., "Understanding radiative transfer in the midware infrared, a precursor to full spectrum atmospheric compensation", Proceedings of the SPIE vol. 5425 (Algorithms and Technolgies for Multispectral, Hyperspectral, and Ultraspectral Imagery X), p. 348 (2004).

(Continued)

*Primary Examiner* — Hwa Andrew Lee

(74) *Attorney, Agent, or Firm* — Hamilton, Brook, Smith & Reynolds, P.C.

(57) ABSTRACT

A method and apparatus used for detecting gaseous chemicals. The method and apparatus use an interferometer to filter received light by wavelength, creating an image only using light with wavelengths that are affected by the presence of a gaseous chemical. A reference image composed of light with wavelengths unaffected by the presence of a gaseous chemical is also created and used as a reference. A gaseous chemical is detected where the ratio of the intensity of the two images changes. Despite the high spectral resolution of the filter, the system can operate with a very wide field of view.

26 Claims, 12 Drawing Sheets

(56) References Cited

U.S. PATENT DOCUMENTS

2018/0283949 A1* 10/2018 Visser ............... G01J 3/36

OTHER PUBLICATIONS

Jacquinot, "The Luminosity of Spectrometers with Prisms, Gratings, or Fabry-Perot Etalons", J. Opt. Soc. Am. 44. p. 761 (1954).
Lee et al., "Gas Filter Correlation Instrument for the Remote Sensing of Gas Leaks", Rev. Sci. Instrum. 56, p. 1812 (1985).
Louchet-Chauvet et al., "High Resolution, Large Dynamic Range Spectral Filtering at 800 nm Using Tm:YAG Crystals", Proc. SPIE 7948 (Advances in Photonics of Quantum Computer, Memory, and Communication IV) 2011.
Manolakis et al., "Hyperspectral Imaging Remote Sensing", p. 597, Cambridge University Press: Cambridge, UK 2016.
Rothe et al. Applied Physics 3, 115 (1974).
Rothman et al., "The HITRAN molecular spectroscopic database and HAWKS (HITRAN Atmospheric Workstation): 1996 edition", J. Quant. Spectrosc. Radiat. Transfer, v. 60(5):665-710 (1998).
Tay et al., "Coherent Optical Ultrasound Detection with Rare-Earth Ion Dopants", Appl. Optics 49, p. 4331 (2010).
Vaughan, "The Fabry-Perot Interferometer", Ch. 2 Adam Hilger, Bristol and Philadelphia (1989).
Yariv, "Optical Electronics", Ch. 5. Saunders College Publishing (1991).

* cited by examiner

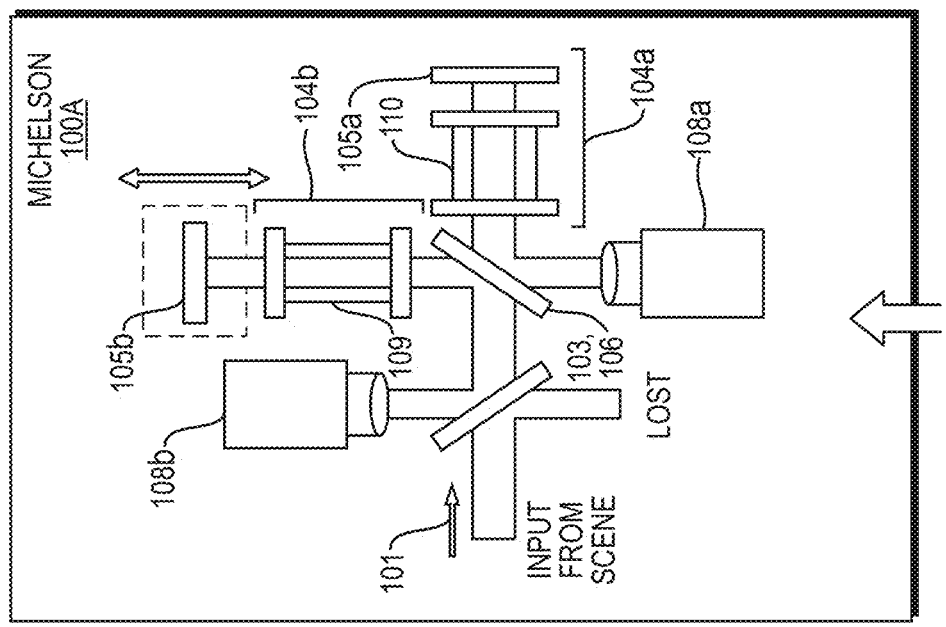

US 10,794,819 B2

WIDE FIELD OF VIEW NARROWBAND IMAGING FILTER TECHNOLOGY

GOVERNMENT SUPPORT

This invention was made with Government support under Contract No. FA8721-05-C-0002 with the U.S. Air Force. The Government has certain rights in the invention.

BACKGROUND

Gaseous chemicals interact with electromagnetic radiation (light) as specific wavelengths. The wavelengths of light affected are determined by the properties of the chemical, leading to absorption or emission spectra unique to each chemical. Therefore, it is possible to detect the presence of a particular gaseous chemical by monitoring light with wavelengths spanning the region of the spectrum where the chemical has unique absorption/emission features. However, some chemicals, especially but not exclusively small molecular gases with fundamental vibrational absorption resonances in ~3-5 nm region sometimes referred to at MWIR or midwave infrared, have absorption features of very narrow, widely separated absorption lines. These absorption features are generally 1-5 GHz wide and separated by tens to hundreds of GHz. Therefore, chemical detection systems designed to detect such gases require very high spectral resolution to maximize detection sensitivity and specificity (not confusing one species for another) and to avoid excessive noise originating from light outside the gases chemical absorption features or resonances.

The field of view of a chemical sensing system is important, the wider the field of view of an airborne system, the higher its area coverage rate. Wide field of view generally implies tens of degrees. Existing prior art wide field of view chemical sensing systems based, for example, on the hyperspectral imaging (HSI) architecture, exhibit a relationship between spectral resolution and field of view (the higher the spectral resolution, the narrower the field of view). This relationship limits the field of view, and therefore area coverage rate of such a chemical sensing system if the spectral resolution were matched to the narrow width of absorption features. Prior art chemical sensing systems cannot detect chemicals, such as small molecular gases, at the highest sensitivity over a wide field of view. A new architecture without this limitation could enable detection of natural gas pipeline leaks, for example, over an entire delivery network.

What is needed is a light filter and chemical detection architecture that has a wide field of view in combination with high spectral resolution (where "wide field of view" is meant to denote approximately ten or several tens of degrees).

SUMMARY

In a filter for light, an associated method includes receiving, with an optical system, wide band light across a wide field of view. The received light is split by a first beamsplitter onto two paths; one of the two paths includes an optical cell containing a gas with absorption features containing a resonant wavelength range. The split received light on one of the paths passes through the optical cell. When the split received light passes through the optical cell, the optical cell induces a phase shift in light with wavelengths inside the resonant wavelength range. At the end of the two paths, a second beamsplitter recombines the portions of the split received light at an output. The recombining of the split received light from the two paths creates a relative one-half wavelength phase shift and the split light having a wavelength outside the resonant wavelength is recombined primarily with a one-half wavelength phase difference and the split light having a wavelength inside the resonant wavelength is recombined substantially with no phase difference at the output. The phase differences cause the split received light having a wavelength outside the resonant wavelength to be recombined primarily with a destructive interference at the output and the split received light having a wavelength inside the resonant wavelength range to be recombined with substantial constructive interference at the output. Alternatively, the relative one-half wavelength phase shift may be induced at any point within the interferometer.

The filter for light can be utilized as part of a detector for a gaseous chemical. The detector recombines the split received light on the two paths at first and second outputs. Split received light having a wavelength outside the resonant wavelength range is recombined primarily with no phase difference at the first output which produces constructive interference and is recombined primarily with a one-half wavelength phase difference at the second output which produces destructive interference. But, split received light having a wavelength inside the resonant wavelength range is recombined substantially with no phase difference at the second output which produces substantial constructive interference and is recombined substantially with a one-half wavelength phase difference at the first output which produces substantial destructive interference. A first photodetector measures the intensity of the recombined light at the first output and a second photodetector measures the intensity of the recombined light at the second output. The intensity measured at the first output will substantially be composed of light having a wavelength outside the resonant wavelength range and the intensity measured at the second output will be substantially composed of light having a wavelength inside the resonant wavelength range. The presence of the gaseous chemical can be detected based upon the intensities measured by the first and second photodetectors.

The received light may be composed of light with wavelengths within the infrared spectrum. The received light may have its level of collimation modified by an optical system. The received light and the light may also be received by viewing the ground from a position above.

The two paths may be configured as a Michelson interferometer.

Split received light having a wavelength inside the resonant wavelength range may be recombined with no phase difference at the second output and a one-half wavelength phase difference at the first output.

The first and second photodetectors may measure a two-dimensional image. In this case, the presence of the gaseous chemical may be detected utilizing a relationship between the two-dimensional images on a pixel-by-pixel basis to determine the presence of the gaseous chemical.

The detection sensitivity of the filter may be optimized by altering the concentrations of the gaseous chemical and a buffer gas inside the optical cell. In this case, the resonant wavelength range may depend upon a partial pressure of the buffer gas inside the optical cell.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 1B-1D depict examples of different interferometer architecture that may be utilized by example embodiments.

DETAILED DESCRIPTION

A description of example embodiments follows.

Figure 1A:
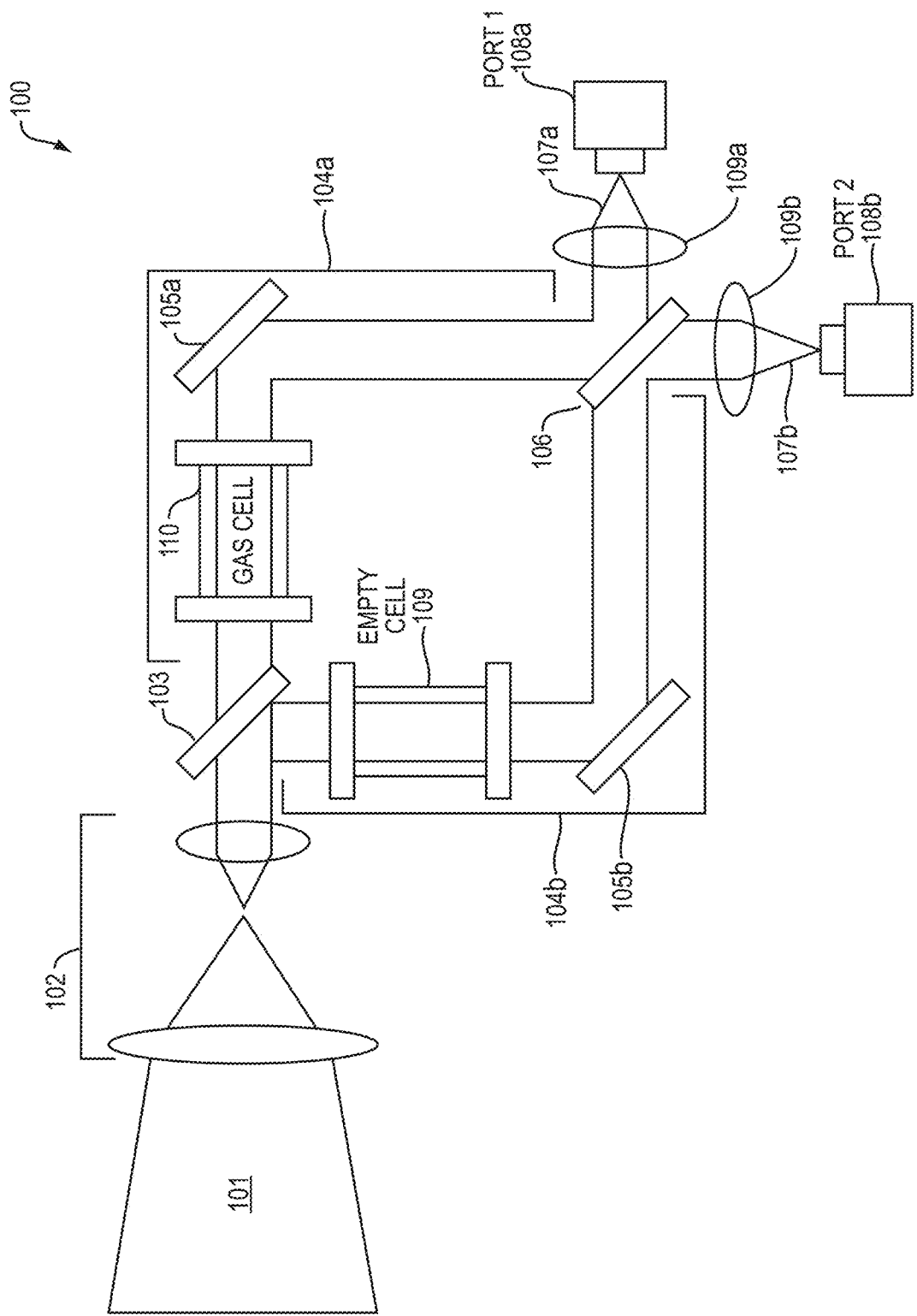
FIG. 1A depicts the architecture of an interferometer used to filter light.

FIG. 1A is a diagram of an interferometer 100 used to filter received light 101. Received light 101 is broad band light received across a wide field of view and may be, for example only, infrared light, and may be from a two-dimensional scene. Received light 101 may also have its level of collimation modified by optical system 102 at the entrance of interferometer 100. Optical system 102 may be a mirror system, lens system or other optical system. In interferometer 100, received light 101 is split onto two paths 104a and 104b by beam splitter 103. Beam splitter 103 may be a half-silvered mirror, a dielectric-coated mirror, a beam-splitting cube, or similar partial reflector. Beam splitter 103 may have an anti-reflection coating on non-beam-splitting surfaces. Received light 101 is split and then directed onto paths 104a and 104b by mirrors 105a and 105b respectively. Paths 104a and 104b are equal length in and therefore path-matched. At the end of paths 104a and 104b, the split portions of received light 101 are recombined by a second beam splitter 106. Beam splitter 106 may have an anti-reflection coating on non-beam-splitting surfaces. Beam splitter 106 may be a half-silvered mirror, a dielectric-coated mirror, a beam-splitting cube, or similar partial reflector. Beam splitter 106 sends recombined light into two outputs 107a and 107b. Each output 107a and 107b has a photodetector 108a and 108b that detects, measures and records the intensity of recombined light 101. In some embodiments, photodetectors 108a and 108b may be designed to detect only specific ranges of wavelengths of light. When used in an imaging mode and detectors 108a and 108b are multi-pixel detectors, imaging optics 109a and 109b would be used.

Figure 1C:
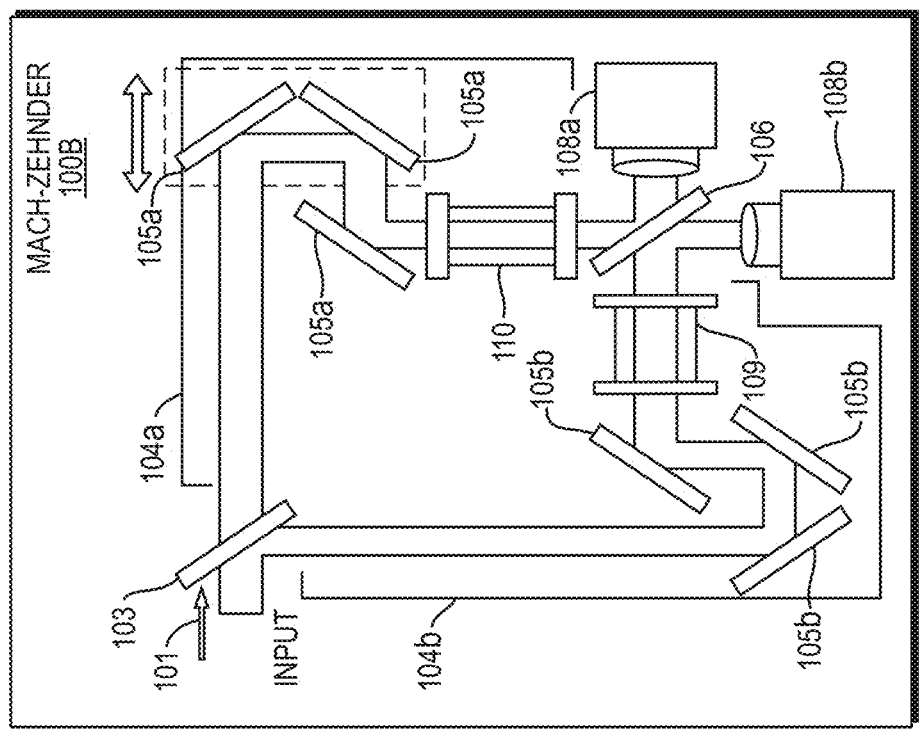
Figure 1D:
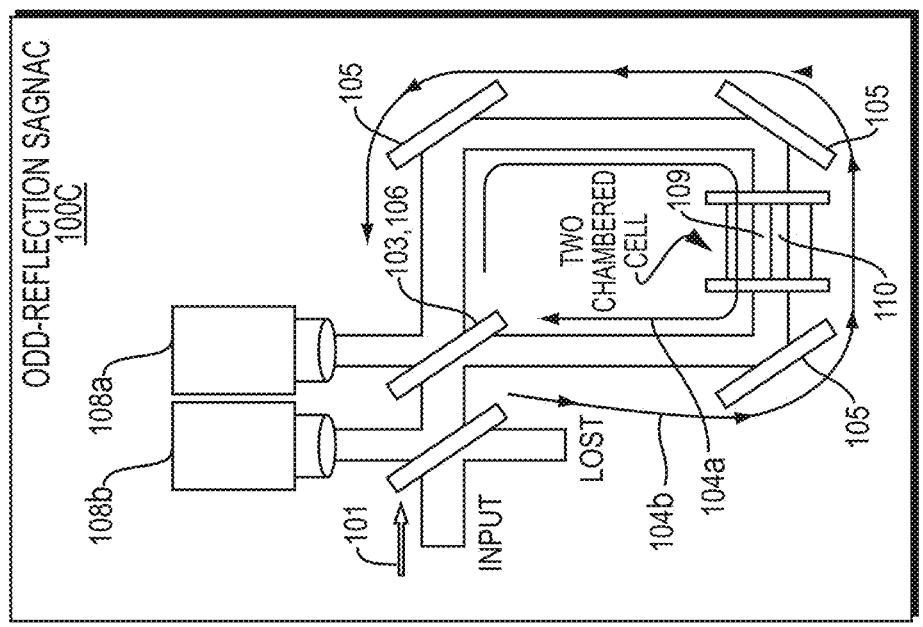

FIGS. 1B, 1C and 1D are diagrams of interferometers with a range of architectures. The method and detector may utilize an interferometer with Michelson 100A, Mach-Zehnder 100B or other architecture such as Odd-Reflection Sagnac architecture 100C. Paths 104a and 104b and mirrors 105, 105a and 105b of interferometer 100 may vary in layout or length as long as paths 104a and 104b remain path-matched. Different interferometer architecture and/or path length may be utilized to meet difference needs such as but not limited to stability, size, ease of alignment, and other optical properties. In some interferometer architecture, such as Odd-Reflection Sagnac architecture 100C, gas cell 110 and empty cell 109 may be combined as a two-chambered cell.

When two propagating waves of the same frequency type, in this case light waves, are combined the result can be a wave with greater, lower or equal amplitude. The intensity of the resultant wave depends upon the phase difference between the two input waves. Constructive interference occurs if there is close to no phase difference (relative to the wavelength), or if the phase difference is close to an integer multiple of the wavelength. Destructive interference occurs if there is a phase difference close to one half of an odd integer multiple of the wavelength. Phase differences between two waves can be created by relative phase shifts. One way to induce a relative phase shift is for two waves to travel different effective distances. Effective distance is the physical distance traveled multiplied by the index of refraction. Phase shifts can also, under certain circumstances, be induced when a wave is reflected.

In FIG. 1A at first output 107a, both portions of split received light 101 have traveled the same distance over paths 104a and 104b and undergone no phase shift relative to each other. Therefore, at first output 107a, the split received light 101 are recombined primarily in phase. Light that is combined in phase undergoes constructive interference resulting in received light 101 at first output 107a having double the intensity of received light 101 when it was traveling down each path 104a and 104b and equal intensity to received light 101 when it entered interferometer 100. In other terms, received light 101 at first output 107a should have similar intensity to received light 101 when it entered interferometer 100. While, due to minor imperfections in interferometer 100 or other variables, some light will not be combined with perfect constructive interference, the received light 101 will primarily be recombined in phase so that the intensity measured at first output 107a will be similar to the intensity of received light 101 when it entered interferometer 100.

At the second output 107b, the portions of split received light 101 have also traveled the same distance over both paths 104a and 104b. However, the received light 101 traveling down path 104b picks up an additional 7C phase shift ($\lambda/2$ or half a wavelength) of phase due to beam splitter 103, which is not picked up in path 104a. Therefore, at second output 107b, the split received light 101 are recombined one half wavelength out of phase. Light that is combined one half wavelength out of phase undergoes destructive interference, resulting in the light at output 107b having zero amplitude and there being a complete lack of light detected. While, due to minor imperfections in interferometer 100 or other variables, some light will not be combined with perfect destructive interference the intensity measured at second output 107b will approach zero.

Figure 2:
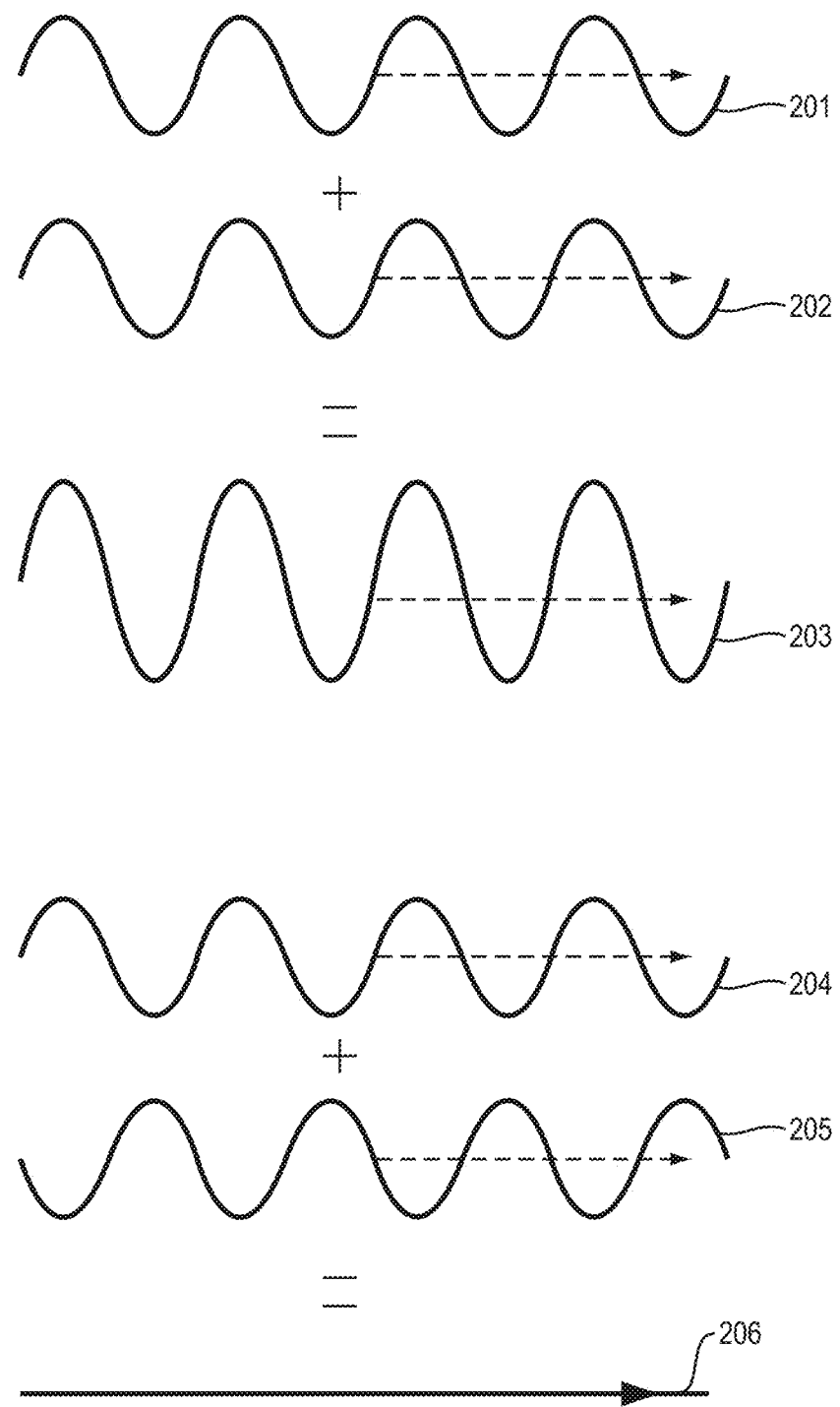
FIG. 2 is a diagram of constructive and destructive interference of light waves.

FIG. 2. is a diagram of constructive and destructive interference. Light waves 201 and 202 are representations of received light 101 when it is recombined by beam splitter 106 without a phase difference. Because of the continuous nature of light waves, two waves with a phase difference that is a full integer of a wavelength, for example 5 wavelengths or 13 wavelengths, are recombined just as if there was no phase difference. Therefore, integer wavelength phase differences are considered to effectively be no phase difference, 0=Nλ. (where N is any integer), and produce the same behavior as light waves 201 and 202. Light wave 203 is a representation of received light 101 when it is recombined at first output 107a. The result is light wave 203 with double the intensity of light waves 201 and 202.

Light waves 204 and 205 are representations of received light 101 when it is recombined by beam splitter 106 with a phase difference of one half wavelength. Because of the continuous nature of light waves, two waves with a phase difference that is a full integer of a wavelength plus one-half wavelength, for example 5.5 wavelengths or 13.5 wavelengths, are recombined just as if there was a phase difference of one-half wavelength. Therefore, integer wavelength plus one-half wavelength phase differences are considered to effectively be a one-half wavelength phase difference, ½=½+Nλ (where N is any integer), and produce the same behavior as light waves 204 and 205. Light wave 206 is a representation of received light 101 when it is at second output 107b. Light waves 204 and 205 are combined with a phase difference of one-half wavelength. The result is light wave 206 with zero amplitude or intensity. Light that is recombined with a phase difference that is not zero or one-half wavelength is combined will have an intensity between that of 203 and 206.

The number of full wavelengths of path difference over which constructive/destructive interference is maintained in the manner described above is limited and determined by the optical bandwidth admitted to the interferometer. Generally, the constructive/destructive interference is maintained up to a path difference of 250 microns or approximately 50 wavelengths.

Figure 3:
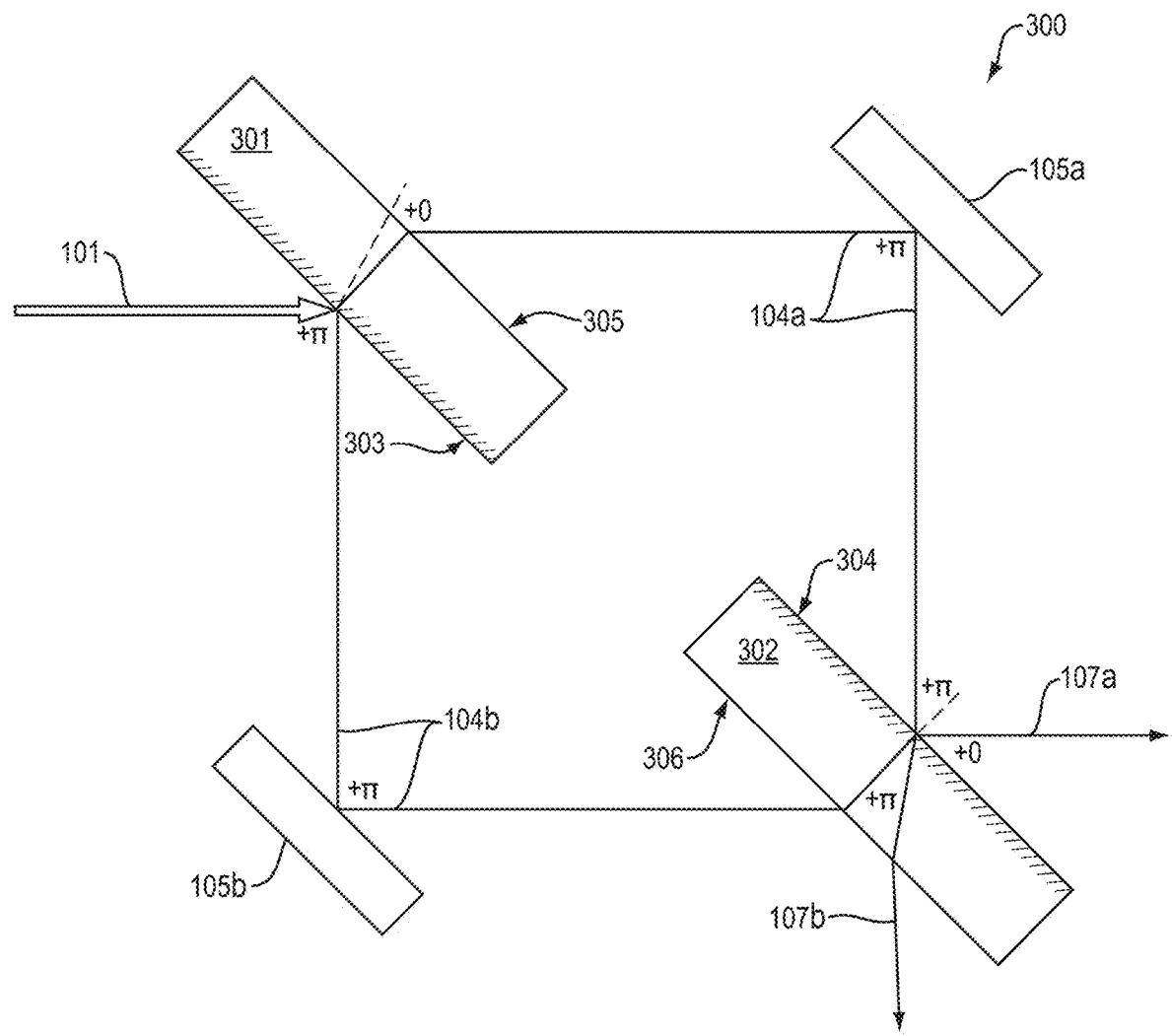
FIG. 3 is a diagram of the phase shifts created in light as it travels through an interferometer.

FIG. 3 is a diagram of a Mach-Zehnder interferometer 300 with beam splitting and recombining as applies to an embodiment of the current invention. The interferometer has two beam splitters 301, 302. Each beam splitter has a side with a partially-reflecting dielectric coating 303 and 304 and a side with an antireflection coating 305 and 306.

When light reflects off a surface that has a higher index of refraction than that of the initial material, if undergoes a phase shift of π radians of one-half wavelength. When light reflects off a surface of a material with lower index of refraction, the light does not accumulate an extra phase shift. A beam splitter, for example beam splitters 301 and 302, may be made by applying a partially reflecting dielectric thin film coating to one surface 303 and 304, which reflects roughly 50% of the incident light and transmits roughly 50% of the incident light, and applying an antireflection coating to the other surface which exhibits very low reflectivity and hence transmits nearly all the incident light. The partially reflecting surface can also be produced with a partially transparent metal coating. Other implementations such as pellicles and beam splitting cubes can be shown to be equivalent. As the index of refraction of the beam splitter material is higher than that of air, light incident onto the beam splitting side from air will pick up an additional π phase shift. Light incident on the beam splitting side from the other surface (through the optical material first) will not pick up an additional π phase shift.

Light exiting output 107a is the combination of received light 101 that has traveled along two paths 104a and 104b. Light traveling along path 104a travels through first beamsplitter 103, 301 (no phase addition), reflects off mirror 105a picking up a phase of π, and then reflects off of front surface of second beam splitter 106, 302 picking up additional π for a total extra phase of 2π. Light traveling the other path 104b picks up π reflecting off front surface of initial beam splitter 103, 303 and another π off mirror 105b, then is transmitted through second beamsplitter 106, 306. There is no relative phase difference between the two portions of light at output 107a and so they constructively interfere.

Light exiting output 107b is similarly the combination of light 101 that has traveled along two different paths 104a and 104b. Light traveling along path 104a first is transmitted through first beam splitter 103, 301 is reflected off mirror 105a picking up π additional phase, and then is transmitted through beam splitter 106, 302 resulting in a total extra phase accumulation of just π. Light traveling along path 104b first reflects off first beam splitter 103, 301 picking up π phase, reflects off mirror 105b picking up another π, and then enters beam splitter 106, 306 reflecting off of the partially reflecting surface from the material of the beam splitter which has a higher index of refraction, therefore not picking up an additional π. Therefore, the phase difference between the two portions of light is just π (or one half of a wavelength), and the light at output 107b undergoes destructive interference.

Referring to FIG. 1A, due to constructive interference at the first output 107a and destructive interference at the second output 107b, the normal behavior of received light 101 in interferometer 100 is to send full intensity light out the first output 107a to be detected and measured by first photodetector 108a and to send zero intensity light out of the second output 107b to be detected and measured by second photodetector 108b. Interferometer 100 preserves the normal behavior of received light 101 across a wide optical band and across a wide field of view as long as paths 104a and 104b remain path matched.

The method and apparatus selectively disrupts the normal behavior of interferometer 100. Optical cell 110 is placed so that received light 101 traveling down path 104a passes through it. To maintain symmetry, empty cell 109 may be placed so that the received light 101 traveling down the path 104b passes through it. Since paths 104a and 104b are path matched, the contents of optical cell 110 and empty cell 109 can provide the only difference in effective distance between the two paths 104a and 104b. Therefore, the different speeds at which light propagates through optical cell 110 and empty cell 109 can create a phase difference between light traveling down paths 104a and 104b. Optical cell 110 contains a quantity of the gas to be detected. Optical cell 110 may also contain a buffer gas to control pressure.

Gases absorb radiation, for example light waves, at specific frequencies and wavelengths based upon their atomic and molecular structure. The wavelengths of light a gas absorbs determine its absorption features. For small molecular gases, the absorption features are each around 1-5 GHz wide, and separated by tens to hundreds of GHz. The absorption features of a gas contain resonant wavelengths. Resonant wavelengths are the wavelengths at which a gas absorbs a significant amount of light. Therefore, broadband light passing through a gas is most affected at wavelengths that match the gas's resonant wavelengths. In theory, gases should only absorb light at discrete wavelengths and a gas's absorption features would be composed of a series of discreet absorption lines. Therefore, a gas's resonant wavelengths should just be the location of these discreet absorption lines. However, in practice, absorption lines are expanded to include a range of wavelengths due to several factors, for example, natural or self-broadening due to the uncertainty principle, Doppler broadening due to the distribution of velocities, and pressure or collisional broadening due to the presence of nearby particles. The absorption features of a trace gas dispersed in the atmosphere, after the absorption lines have been broadened due to interaction with surrounding molecules of the air, is its air broadened absorption spectrum. Due to this broadening effect, a gas's resonant wavelength range will be composed of multiple narrow ranges surrounding the original discreet absorption lines.

Figure 4:
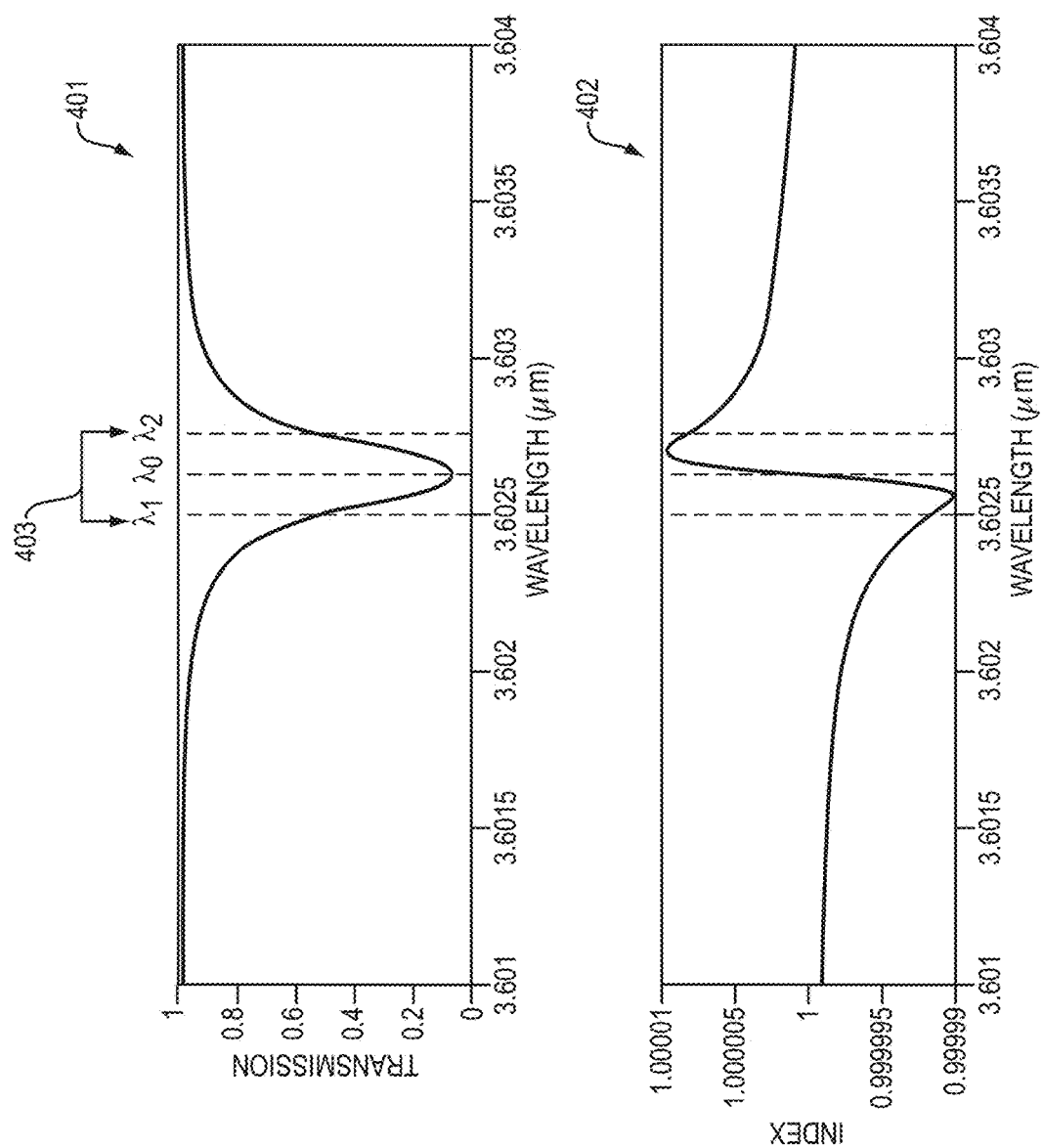
FIG. 4 is a graph showing the relationship between a gas's transmission of light and the gas's index of refraction against wavelength.

FIG. 4 presents two graphs that show the relationship between the transmission and index of refraction of an optical cell filled with HCl gas. Graph 401 is a plot of the fraction of light transmitted through the gas against wavelengths of light. Transmission is reduced when a gas absorbs light. A gas absorbs light at wavelengths within that gas's resonant wavelength range. Wavelength $\lambda_0$ is where the gas absorbs the most light and therefore has the least amount of light transmitted. The range of wavelengths between $\lambda_1$ and $\lambda_2$ represents the full width at half maximum (FWHM), within which there is significant absorption. Therefore, the wavelengths between $\lambda_1$ and $\lambda_2$ are within the gas's resonant wavelength range. Graph 402 is a plot of index of refraction against wavelengths of light. Index of refraction is a measurement of how fast light travels through a medium. A gas's index of refraction at a wavelength is proportional to the derivative of that gas's absorption (1—transmission) of light at that wavelength. Therefore, the gas has an altered index of refraction within its resonance wavelength range, between $\lambda_1$ and $\lambda_2$. An altered index of refraction causes light to travel through gas at different speeds. Therefore, light with a wavelength within the gas's resonant wavelength range 403 has its speed altered when traveling through the gas. However, gas effects transmission significantly only for light with wavelengths within the gas's resonant wavelength range 403. Therefore, a gas would have no significant change in its index of refraction for light with wavelengths outside the gas's resonant wavelength range 403. With no change in the index of refraction, the speed of light for wavelengths outside the resonant wavelength range is unaffected when the light travels through the gas.

Figure 5:
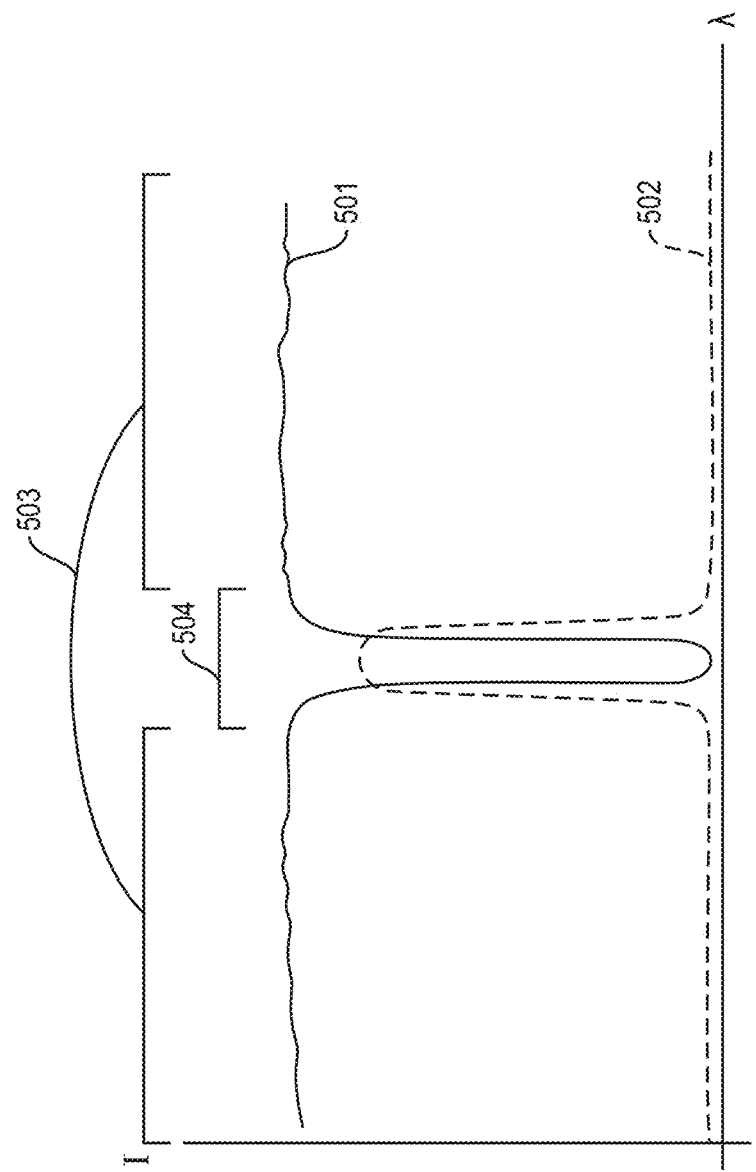
FIG. 5 is an idealization of the measured intensity across a range of wavelengths at two outputs of an interferometer of an example embodiment.

FIG. 5 is an idealization of the intensity of light across of range of wavelengths measured by photodetectors 108a and 108b in interferometer 100 with optical cell 110 in place. Line 501 is a graph of the intensity measured by photodetector 108a at the first output 107a. Line 502 is a graph of the intensity measured by photodetector 108b at the second output 107b. The "normal" behavior of interferometer 100 with paths 104a and 104b path matched is constructive interference creating light with twice the intensity at the first output 107a and destructive interference creating light with zero intensity at the second output 107b. The optical cell only alters the index of refraction for light with wavelengths within the resonant wavelength of the gas in the cell (within resonance) 504. Light with wavelengths outside resonance 503 is unaffected by the presence of the optical cell. Therefore, for light with wavelengths outside the resonance 503, the optical cell creates no change in effective distance between paths 104a and 104b and the "normal" behavior of interferometer 100 continues with the vast majority of light. Wavelengths outside resonance 503 are primarily detected at the first output 107a, and almost no light with wavelengths outside the resonant wavelength range 503 are detected at the second output 107b.

For light with wavelengths within resonance 504 the optical cell changes the index of refraction. A change in the index of refraction in optical cell 110 changes the speed of light traveling down only path 104a of interferometer 100 which alters the effective distance of path 104a. The change in index of refraction is small but the macroscopic distance light travels within optical cell 110 is large enough to have a significant effect. When the effective distance of one path is changed, paths 104a and 104b are no longer path matched and interferometer 100 no longer exhibits "normal" behavior.

The effective path difference between paths 104a and 104b creates a relative phase shift to occur in the portion of light with wavelengths within resonance 504 travelling path 104a relative to the portion of light with wavelengths within resonance 504 travelling path 104b before the light is recombined by beamsplitter 106. The relative phase shift causes the portion of light with wavelengths within resonance 504 to no longer recombine completely in phase at the first output 107a resulting in a reduction and potential elimination of constructive interference and an increase of destructive interference. Therefore, the amount of light with wavelengths within the resonant wavelength range 504 detected at the first output 107a decreases. The relative phase shift also causes light with wavelengths within resonance 504 to no longer recombine with a complete one-half wavelength phase difference at the second output 107b, resulting in a reduction and potential elimination of destructive interference and an increase in constructive interference. Therefore, the amount of light with wavelengths within resonance 504 detected at the second output 107b increases.

The optical cell substantially alters the behavior of interferometer 100 so that the intensity measured at the second output 107b can be used as an accurate measurement of the amount of received light with wavelengths within resonance 504 and the intensity measured at the first output 107a can be used as an accurate measurement of the amount of received light with wavelengths outside resonance 503. For example, by appropriate choice of target gas concentration, buffer gas concentration, and cell length, it is possible for just 1% of the light detected at the first output 107a to be from light with wavelengths within the FWHM of the air-broadened absorption line of a gas like carbon monoxide (CO). Similarly, with the same appropriate choice of target gas concentration, buffer gas concentration, and cell length, 57% of the light detected at the second output 107b is from wavelengths within the FWHM of the air-broadened absorption line for a gas like CO. It is important that the intensity measurement at the second output 107b can be used to detect when the amount of light with wavelengths within gas resonance 504 changes relative to the intensity of all received light 101 across all wavelengths.

Due to the selective alteration of the index of refraction, interferometer 100 with optical cell 110 acts as a filter for light with wavelengths within resonance 504. Light with wavelengths within resonance (within the resonant wavelength range of the gas in the cell) 504 is primarily detected by the second photodetector 108b at the second output 107b. Light with wavelengths outside resonance (outside the resonant wavelength range of the gas in the cell) 503 is primarily detected by the first photodetector 108a at the first output 107a. This filtering allows for the isolation of light within the very narrow range of resonance 504 and the ability to monitor light within that narrow range of wavelengths 504 without large amounts of interference or noise from light with wavelengths outside of that range 503. The wavelengths that are filtered can be controlled by the type of gas placed in optical cell 110.

In an example embodiment, the gas is carbon monoxide, which has absorption features that contain a band of absorption lines in the midwave infrared between 4500 nm and 4900 nm. The strongest five lines of the R branch of this band are at 4587.641 nm, 4594.995 nm, 4602.449 nm, 4610.004 nm, and 4617.661 nm (accounting for the pressure-dependent line shift), and the air-broadened full width at half maximum of the lines are all roughly 0.040 nm wide. Therefore, the resonant wavelength range would be 4587.621-4587.661, 4594.975-4595.015, 4602.429-4602.469, 4609.984-4610.024, and 4617.641-4617.681 nm. In an example embodiment utilizing carbon monoxide, the light detected at the second output would primarily be composed of light with wavelengths within + or −0.02 nm of each of these lines, and the light detected at the first output would primarily be composed of light at wavelengths between these lines, and not within 0.02 nm of the lines. Successively less strong absorption lines would also contribute, but with less efficiency, unless an auxiliary bandpass filter is used. One benefit of the invention is that the interferometer can act as a filter for multiple absorption features around 1-5 GHz wide, even if they are separated by tens to hundreds of GHz. The invention can remain a sensitive enough filter to very narrow absorption features while still accepting light across a large enough range of wavelengths to filter multiple absorption features even if they are separated by tens to hundreds of GHz.

Figure 6:
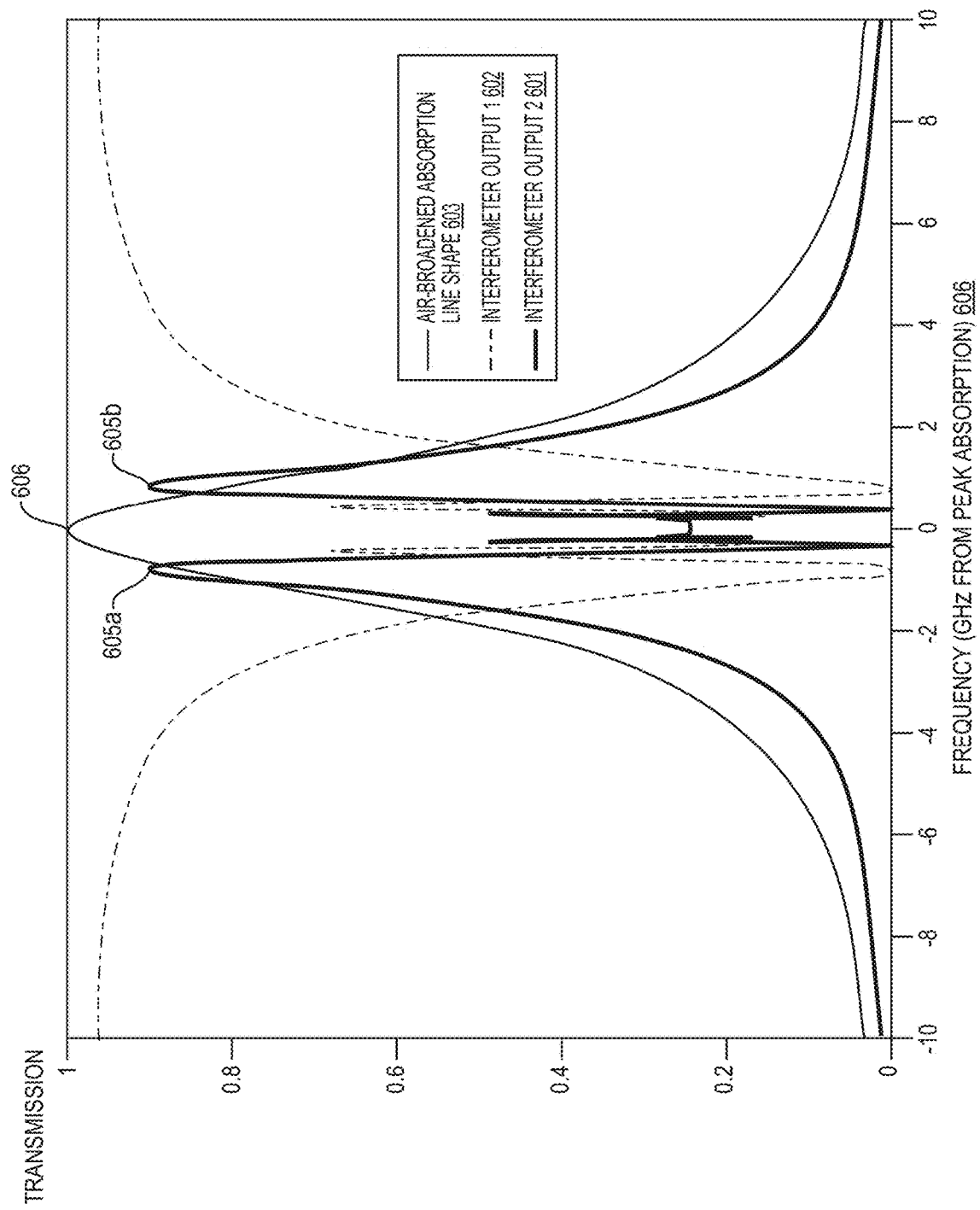
FIG. 6 is a detailed graph of the intensity measured at the two outputs against wavelength after the received light has been filtered based on wavelength by the interferometer used by the method and detector.

FIG. 6 is a detailed graph of the relative intensity of received light 101 measured at the two outputs 107a and 107b against wavelength after the received light has been filtered by interferometer 100. The x-axis is the amount of light transmitted. The y-axis is the frequency (in GHz) away from the peak absorption of the gas contained in the optical cell. Line 601 is intensity of light measured by second photodetector 108b at the second output 107b with CO gas in optical cell 110. Line 602 is intensity of light measured by first photodetector 108a at the first output 107a with CO gas and nitrogen in optical cell 110. Line 603 is the normalized air-broadened line shape of low-density carbon monoxide, as it would be detected in the atmosphere, for comparison. The air-broadened linewidth is the width of the absorption resonance when a trace gas is mixed in the atmosphere (the way it would be if we were trying to detect a gas release). In general, as explained by in FIG. 5 and associated description, light with wavelengths within resonance of the gas in optical cell 110 is primarily detected at the second output 107b and light with wavelengths outside the resonant wavelength range 503 that compose the absorption spectrum of the gas in optical cell 110 is primarily detected at the second output. However, because index of refraction is related to the derivative of absorption 603 (one minus the transmission 401), there is no change in index of refraction at peak absorption/minimum transmission 606. Without a change in index of refraction there is no corresponding change in effective path length and therefore no change in "normal" interferometer behavior. This results in the double peaks of measured intensity 605a and 605b surrounding peak absorptions and a drop towards approximately 25% measured intensity detection at the peak absorption 606 at the second output 601. While the drop of intensity at the second output at peak absorption 606 reduces the intensity measured, the double peaks 605 are large enough to admit enough light within the resonance to create an accurate and detectable measurement. There are also small variations of measured intensity that occur surrounding peak absorption 606. This is because the strong absorption near the line center creates multiple wavelengths of phase difference. However, the variations surrounding peak absorption 606 are small enough that they do not distort the intensity measurement done by photodetectors 108a and 108b at the first and second outputs 107a and 107b.

The gas's resonant wavelength range, and therefore the wavelengths filtered, can be controlled through broadening effects by changing the pressure of the optical cell and/or the addition of a buffer gas to the optical cell. The scope or field of view of the received light 101 does not alter the filtering behavior of interferometer 100. Interferometer 100 can filter light to outputs 107a and 107b if the light is from a one-dimensional source, an entire two-dimensional scene or a single pixel of a two-dimensional scene. No matter the source or properties of received light, the range of wavelengths filtered by interferometer 100 is affected only by the contents and pressure of optical cell 110.

Once light is accurately and narrowly filtered based upon its wavelength, the filtered light is used to detect the presence of a gaseous chemical. In general, background light comes from the thermal emission from the ground and aerosol particles in the atmosphere, and solar radiation reflected by the ground and scattered by aerosols and atmospheric gases, in varying proportion depending on wavelength, ground temperature, atmospheric composition, and other variables. If a gaseous chemical is present in an area, it interacts with this emitted and reflected light passing through that area. Interaction with a gaseous chemical alters the intensity of light passing through the area. The wavelengths at which the gaseous chemical interacts with light compose that chemical's absorption features. The range of wavelengths that define a gas's absorption features are that gas's resonant wavelengths. Therefore, broadband light that passes through a gaseous chemical will have altered intensity within the gas's resonant wavelength range.

If the background radiation is primarily from thermal emission (rather than reflected or scattered solar radiation), and if a gaseous chemical has a lower temperature than the ground or other thermal source of light, the gaseous chemical will absorb light with wavelengths within the resonant wavelength range that corresponds the gaseous chemical's absorption features. Therefore, any detector measuring the intensity of light that passes from the ground or other source through a cloud of a gaseous chemical will see a reduction in the intensity of light with wavelengths within the resonant wavelength range. However, if the background radiation is primarily from thermal emission (rather than reflected or scattered solar radiation), and if a gaseous chemical has a higher temperature than the ground or other thermal source of light, the gaseous chemical will emit light with wavelengths within the resonant wavelength range. If the background radiation is primarily from reflected or scattered solar radiation, the gaseous chemical will absorb light with wavelengths within the resonant wavelengths. The filter described earlier is used to isolate light with wavelengths within the gas's resonant wavelength range in order to detect the intensity changes caused by the presence of the gaseous chemical.

Figure 7:
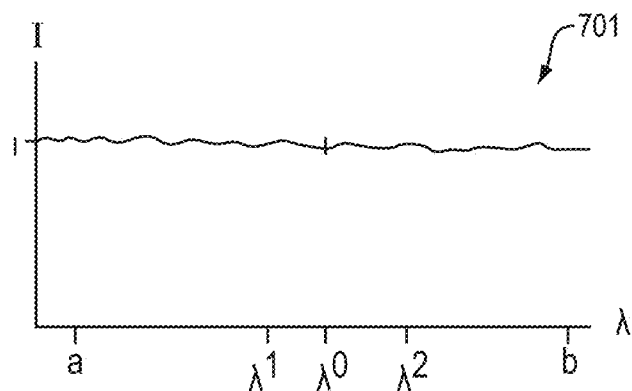
FIG. 7 is a set of graphs showing the effect the presence of a gaseous chemical has on the intensity of light at specific wavelengths.
Figure 7:
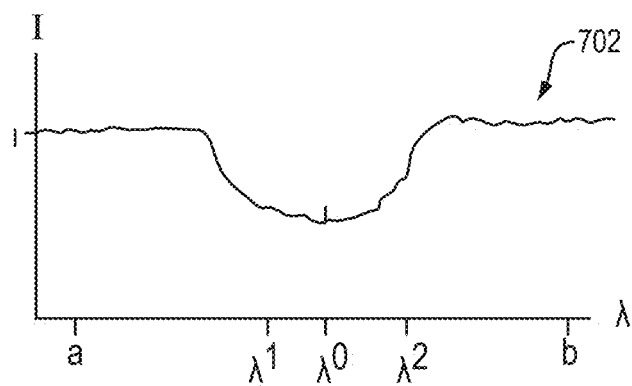
Figure 7:
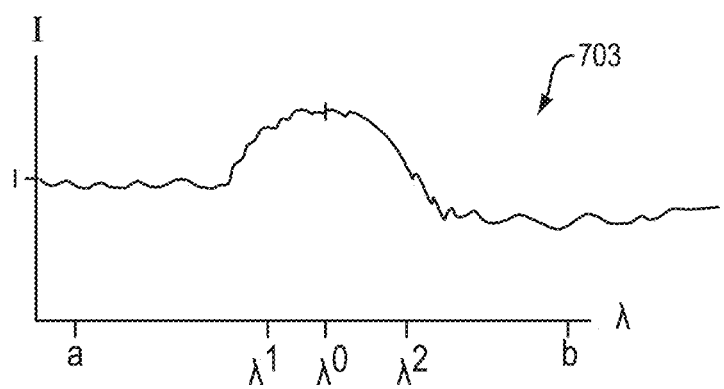

FIG. 7 is a set of graphs showing the effect the presence of a gaseous chemical has on the intensity of wide band light at specific wavelengths before light is filtered by interferometer 100. The gaseous chemical has absorption features containing a peak of absorption at $\lambda_0$ with a resonant wavelength range from $\lambda_1$ to $\lambda_2$. Graph 701 shows the intensity of light primarily from a thermal source against wavelength without the presence of a gaseous chemical. Without a gaseous chemical the intensity of light remains relatively stable across all wavelengths with no identifiable behavior within the resonant wavelength range. Graph 702 shows the intensity of light against wavelength with the presence of a gaseous chemical that has a lower temperature than the thermal light source. The gaseous chemical absorbs light with wavelengths within the resonant wavelength range of its air broadened absorption spectrum. This results in a reduction of intensity between $\lambda_1$ and $\lambda_2$ but no change in intensity outside $\lambda_1$ and $\lambda_2$. Graph 703 shows the intensity of light against wavelength with the presence of a gaseous chemical that has a higher temperature than the thermal light source. The gaseous chemical emits light with wavelengths within the resonant wavelength range of its air broadened absorption features. This results in an increase of intensity between $\lambda_1$ and $\lambda_2$ but no change in intensity outside $\lambda_1$ and $\lambda_2$.

The presence of a gaseous chemical can be determined by measuring the ratio of the intensity of light outside $\lambda_1$ and $\lambda_2$, light with wavelengths outside the gaseous chemical's resonant wavelength range, and the intensity of light inside $\lambda_1$ and $\lambda_2$, light inside the gaseous chemical's resonance. The intensity of light outside $\lambda_1$ and $\lambda_2$ can be determined by detection at output 107a with any appropriate photodetector, as such detectors integrate the light across the detected wavelength range. Because of the spectral properties of the filter created by the interferometer, this detector primarily measures light with from wavelength a to wavelength $\lambda_1$ and from wavelength $\lambda_2$ to wavelength b. This value generally remains constant if there is no gaseous chemical, graph 701, a cold gaseous chemical, graph 702, or a hot gaseous chemical, graph 703. A similar detector at output 107b will measure the integrated light inside wavelengths $\lambda_1$ and $\lambda_2$. This measurement changes depending on the presence of a gaseous chemical therefore, the ratio of the two integrals will also change. A gaseous chemical can be detected by monitoring the ratio to identify where it changes. The optical power at each output and their ratio can be calculated from a one-dimensional source of light, a two-dimensional scene, or a pixel from a two-dimensional scene.

A ratio is used to detect the presence of the gaseous chemical instead of just the intensity of light inside the gaseous chemical's resonant wavelength range, detected at the second output 107b, because it allows for normalization of additional variables that affect the intensity of light of all wavelengths. For example, temperature, the material of the source, shadows, or other environmental factors all have the potential to affect the intensity of light from a source of scene. However, these sources of intensity variation generally have a uniform or close to uniform effect on light across a range of wavelengths much greater than the resonant wavelength range. In contrast, a gaseous chemical affects intensity of light only at the very narrow range of wavelengths that correspond to its resonant wavelength range. Therefore, by determining the ratio of intensity of light with wavelengths outside the gaseous chemical's resonant wavelength range and the intensity of light inside the gaseous chemical's resonant wavelength range, the change in intensity, if any, created by the presence of the gaseous chemical can be isolated, detected, and measured.

However even after air broadening, the resonant wavelength range of certain gases, for example, wavelength $\lambda_1$ to wavelength $\lambda_2$, is very narrow. A narrow resonant wavelength range means that only a small portion of broadband light will be affected by the gas's presence. Because of this imbalance, a change in the intensity of light created by the gas within the resonant wavelength range can, without filtering, be concealed by the much large amount of unaffected light outside the gas's resonance. Intensity measurements for light outside the affected wavelengths are also necessary to accurately determine the intensity ratio.

A filter is needed to isolate light with wavelengths inside the gaseous chemical's resonance in order to accurately monitor behavior without excess noise from light with wavelengths outside the absorption spectrum. A filter can also isolate light with wavelengths outside the gaseous chemical's resonant wavelengths to create a reference image and light intensity data. Because the typical air-broadened range of the absorption lines that compose certain gas's absorption features, and therefore, the gas's resonant wavelength range, are generally of the order of one to several GHz, a filter must also be this narrow. Prior art filters of this width or spectrometers with this spectral resolution would have exceedingly restricted fields of view, and therefore, would be impractical for wide area search. Interferometer 100 has the ability to filter light by the narrow wavelength ranges that correspond to the resonant wavelengths of the gas placed inside the optical cell while maintaining a wide field of view.

In order to "tune" the interferometer used by the method to detect a specific gaseous chemical optical cell 110 should be filled with the gaseous chemical to be detected. This direct correlation makes interferometer 100 adaptable for the detection of multiple gaseous chemicals. A singular optical cell may be emptied and refilled with different gaseous chemicals based upon the desired usage of the method and/or detector. Optical cells containing different gaseous chemicals may be inserted or removed based upon the gaseous chemical that need to be detected. The optical cell 110 may also be filled with two or more chemicals if the absorption resonances did not overlap in order to detect if any of a set of chemicals were present.

The intensity of light outside $\lambda_1$ and $\lambda_2$, light with wavelengths outside the gaseous chemical's resonant wavelengths, and the intensity of light inside $\lambda_1$ and $\lambda_2$, light inside the gaseous chemical's resonant wavelengths can be calculated using the measurements of the first and second photodetectors 108a and 108b at the first and second outputs 107a and 107b. Because interferometer 100 filters received light 100 with light with wavelengths outside the gaseous chemical's resonant wavelengths primarily to the first output 107a, first photodetector 108a can be used to measure the intensity of light outside $\lambda_1$ and $\lambda_2$. Because interferometer 100 filters light inside the gaseous chemical's resonant wavelengths primarily to the second output 107b, second photodetector 108b can be used to measure the intensity of light inside $\lambda^1$ and $\lambda^2$. Once the two intensities are measured, a processor can be used to calculate the ratio needed to detect and estimate the concentration of a gaseous chemical.

Received light 101 can be captured with known imaging technology such as but not limited to indium-antimonide or mercury-cadmium-telluride focal planes in the midwave infrared (3-5 um); strained-layer-superlattice in the longwave infrared (8-14 um) or silicon and indium-gallium-arsenide detectors in the visible and short-wave IR (900 nm-1800 nm). Received light 101 can be in the form of a two-dimensional scene or image. Interferometer 100 filters received light 101 in an identical manner if received light 101 is a two-dimensional scene or from a single source. If received light 101 is in the form of a two-dimensional scene or image, interferometer will filter received light 101 and create two images. A first image is created at first output 107a and detected and measured by the first photodetector 108a which may be a multi-pixel photodetector. This image will be composed of light with wavelengths outside the resonant wavelengths that compose the absorption spectrum of the gas in optical cell 110. A second image created at second output 107b and measured by the second photodetector 108b which may be a multi-pixel photodetector. This image will be composed of light with wavelengths inside the resonant wavelengths that compose the absorption spectrum of the gas in optical cell 110. Photodetectors 108a and 108b may measure the intensity of the entire image created at their respective outputs 107a and 108b or they may measure the intensity of a single pixel from each image.

The two images are of the same scene but composed of light with different wavelengths. Therefore, the external variables such as temperature, materials, and/or interference have the same effect on both images at the same locations. Because the presence of a gaseous chemical only affects light with wavelengths within its absorption spectrum it will change the intensity of light in the image composed of light directed into the second output 107b if the gas in optical cell 110 has the same absorption spectrum of the gaseous chemical. However, the first image is composed of light outside the gaseous chemical's absorption spectrum and its intensity is not affected by the presence of a gaseous chemical. In other words, the first image created at the first output 107a acts as a reference image of the scene that accounts for all variables that can alter intensity except absorption or emission by a gaseous chemical. The ability to directly compare the two images allows for the normalization of the output intensity data. Creating a reference image that is unaffected by the presence of the gaseous chemical allows for extra variables to be measured and identified without complicated and burdensome calculations. Because only one image is affected by the presence of a gaseous chemical, the area where the gaseous chemical is will have an altered ratio of intensity of the two images. Therefore, a gaseous chemical can be detected when the ratio of intensity of the two images changes. Furthermore, the more the intensity ratio changes, the more gaseous chemical is present to change the intensity measured in the second image. This allows for not only the detection of a gaseous chemical but the measuring of the amount of gaseous chemical present.

The intensity ratio may be created by the intensity of light measured across the entirety of both images. This would allow for quick scans of expansive field of view images to determine if a large area contained a gaseous chemical. However, taking the ratio of the intensity of the entire images would prevent determining the exact area where the gaseous chemical was located. A processor could also be used to calculate the ratio intensity of each pixel in both the images. This would determine where in the image the gaseous chemical was located by identifying the pixels with abnormal intensity ratios.

Figure 8B:
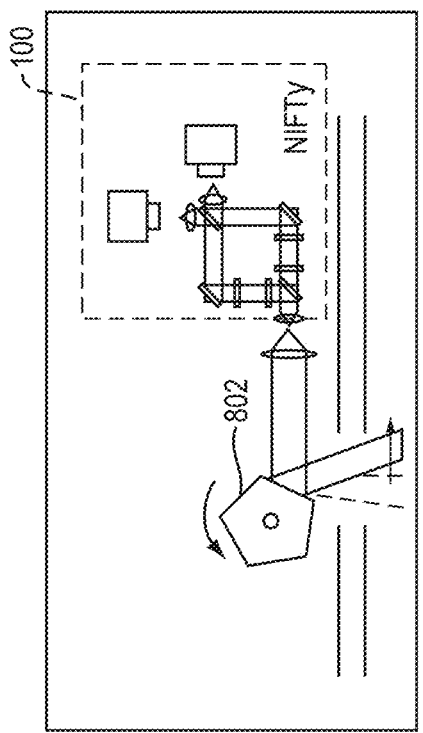
FIGS. 8A and 8B are examples of a detector on a plane being used to monitor an area for a gaseous chemical.
Figure 8A:
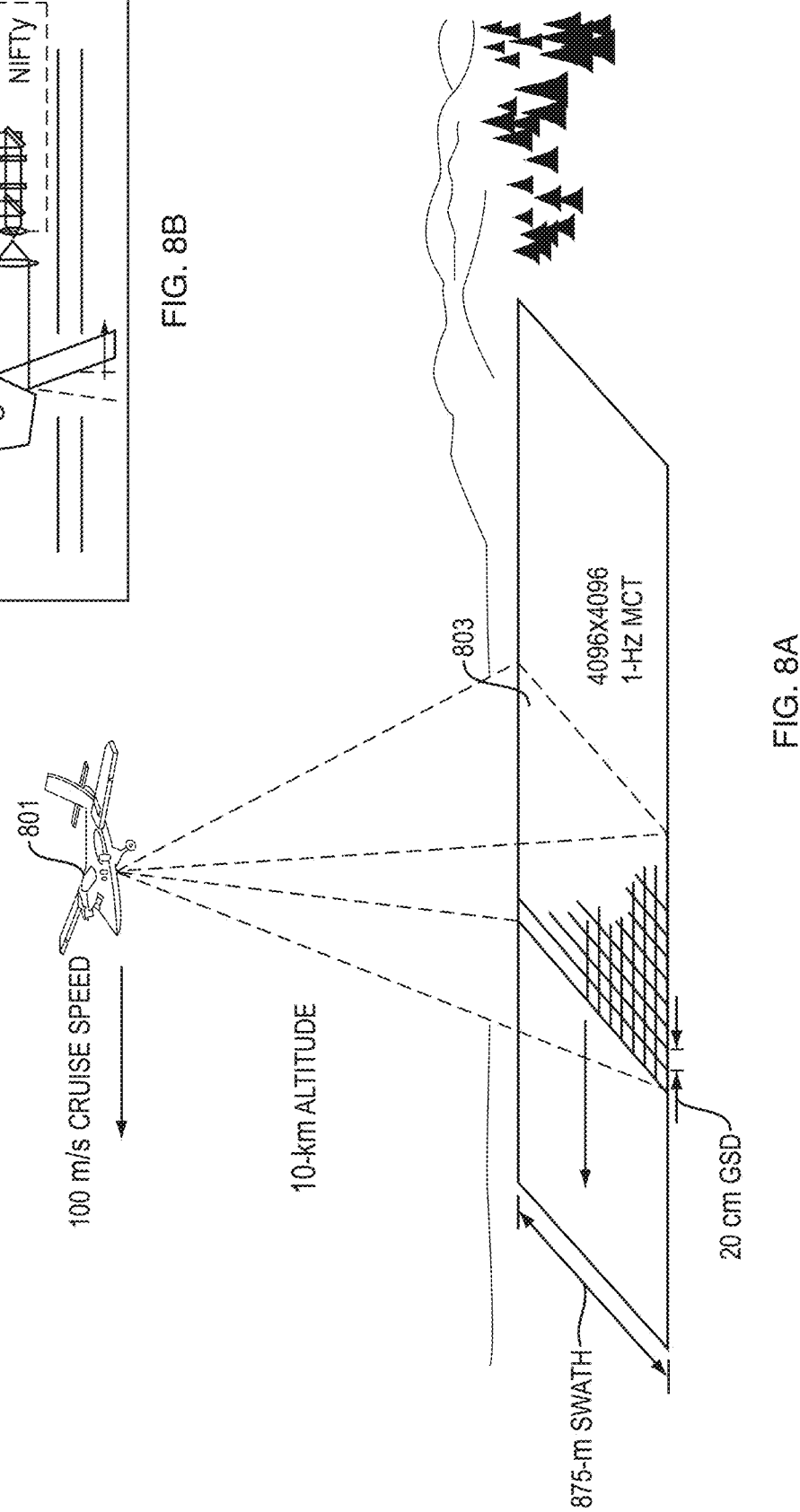

FIGS. 8A and 8B are examples of a detector on a plane being used to monitor an area for a gaseous chemical. Plane 801 contains interferometer 100 that filters received light 101. Optical system 802, in this case a polygonal mirror, is used to direct received light 101 from the sources below into interferometer 100. Area 803 is the source of received light 101. Interferometer 100 creates two images of area 803 at output 107a and 108b where the images intensity is measured by photodetectors 108b and 108a. The ratio of the intensity of the two images of area 803 is calculated. The ratio of the intensity can be calculated across the entire image or calculated for each pixel of the images of area 803. The ratio of the intensity of the images of area 803 is used to determine the location, if any, of a gaseous chemical of area 803. Plane 801, is moving at 100 m/s. As the plane moves forward, the location of area 803 changes allowing for new locations to be the source of received light 101 and be scanned for the presence of a gaseous chemical. The equipment located on plane 801 uses its ability to narrow filter light from a wide field of view to scan large areas located below plane 801 for gaseous chemicals. This greatly increases the speed in detecting chemical effluents by over 100 times the speed of prior art grating or Fourier Transform spectroscopic systems while retaining equivalent sensitivity.

Because the index of refraction is correlated with the derivative of the absorption spectrum of a gas, the index of refraction changes in the "wings of absorption" or the range of wavelengths leading up to peak absorption. Therefore, the wavelengths of light filtered to the second output by the interferometer will not perfectly match the absorption spectrum of the gaseous chemical even if a sample of the gaseous chemical is placed in the optical cell. Furthermore, the absorption spectrum of the gaseous chemical may be broadened, further increasing the difference between the filtered wavelengths and the wavelengths affected by the gaseous chemical. This behavior is suboptimal as the light outside the absorption spectrum interferes with monitoring the behavior of light inside the absorption spectrum. The optical cell length and/or concentration of gas in the cell can be adjusted to fix this behavior.

The optical cell can be filled with a buffer gas used to control the pressure in the cell along with the gaseous chemical to be detected. The sensitivity of the interferometer can be optimized by independently changing the amount of gaseous chemical to be detected in the optical cell as well as the amount of a buffer gas such as nitrogen. Altering these quantities changes the width of the filter created. Therefore, the amount of target gas and buffer gas can be chosen to best match the width of the filter to the absorption features of the gas to be detected.

The ideal partial pressure of target gas and buffer gas for a given length cell can be determined by calculating the noise equivalent concentration length product (NECL), a measure of the system sensitivity, for a range of target gas/buffer gas pairs, and identifying the target pressure/buffer gas pressure combination that minimizes this quantity. Generally, the sensitivity will increase as the width of the resulting filter decreases to approximately the width of the target gas resonance, but will decrease if the filter is made too narrow, because too little light gets through.

Figure 9:
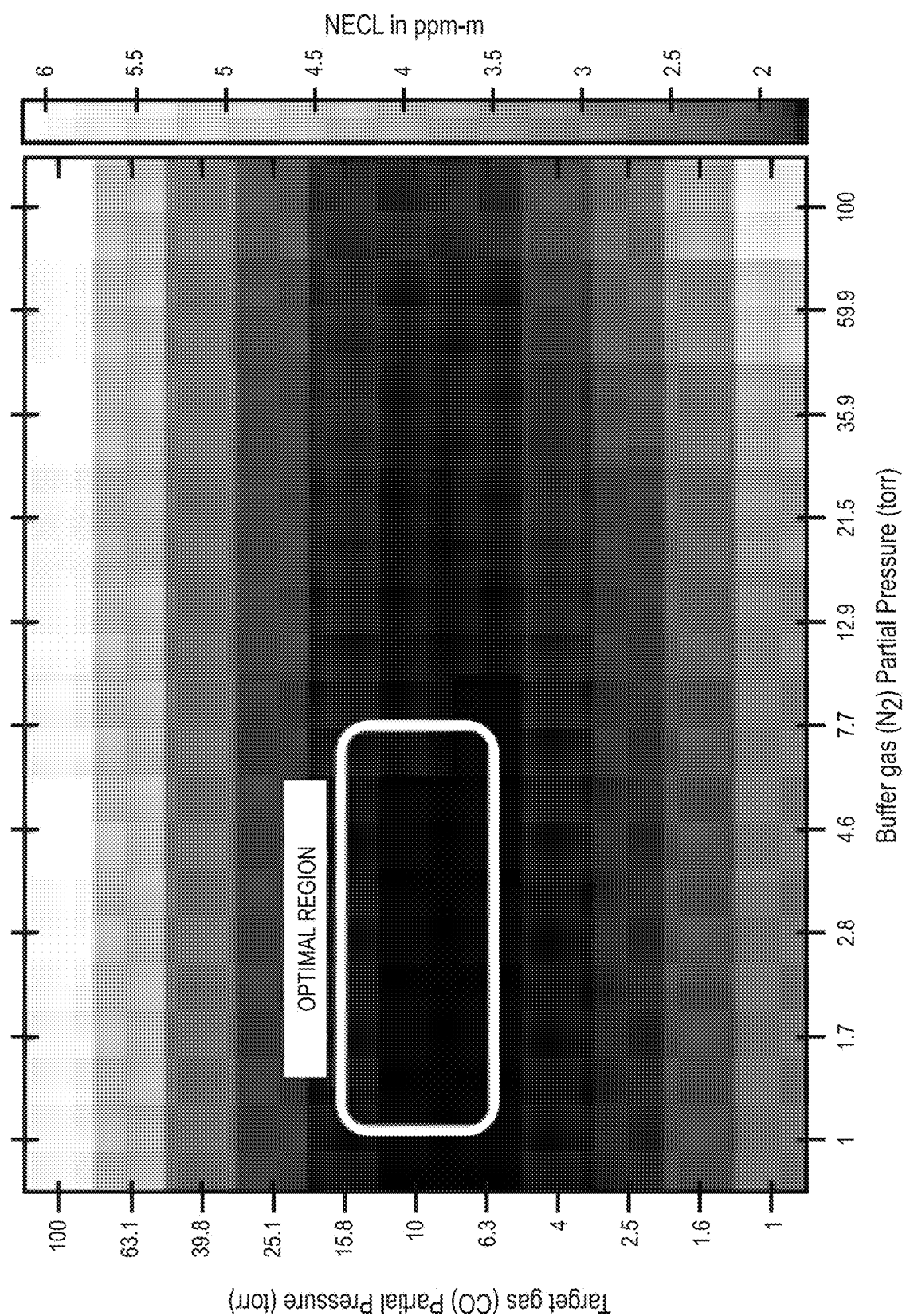
FIG. 9 shows a graph used to determine the optimal partial pressures of the gaseous chemical and buffer gas for a gas cell of a given length used for detecting carbon monoxide.

FIG. 9 shows a graph used to determine the optimal carbon monoxide (CO) and Nitrogen buffer gas ($N_2$) partial pressures for a gas cell of a given length, for a system designed to detect CO. The predicted noise equivalent concentration-length product (NECL), measured in ppm-m, may be calculated using a derivation coupled to a computer simulation or alternatively through experimental values. The color map in FIG. 9 shows the NECL for a range of values of CO partial pressure and $N_2$ partial pressure in the optical cell. The optimal region identifies the values of CO partial pressure and $N_2$ partial pressure in the optical cell that produces the best NECL. Optimizing the NECL provides a balance between narrowing the filter that the resonant frequency of the interferometer matches the absorption features of the target gas and still receiving sufficient light.

While example embodiments have been particularly shown and described, it will be understood by those skilled in the art that various changes in form and details may be made therein without departing from the scope of the embodiments encompassed by the appended claims.

What is claimed is:

1. A method for locating a gaseous chemical, the method comprising:
   receiving wide band light;

splitting, with a first beamsplitter, the received light onto a first path and a second path;

passing the split received light on the first path through an optical cell containing a gas with absorption features containing a resonant wavelength range;

inducing, by the optical cell, a phase shift in light with wavelengths inside the resonant wavelength range that passes through the optical cell;

recombining the split received light from the two paths, with a second beamsplitter, at a first output and a second output;

inducing a relative one-half wavelength phase difference between the split received light on the first and second paths recombined at the second output, split received light with wavelengths outside the resonant wavelength range being recombined with primarily constructive interference at the first output and being recombined with primarily destructive interference at the second output;

measuring intensity of the recombined light at the first output;

measuring intensity of the recombined light at the second output, the recombined light at the second output being substantially composed of light with wavelengths inside the resonant wavelength range; and determining, with an electronic processor, the presence of the gaseous chemical based upon the intensity measured at the first output and the intensity measured at the second output.

2. The method of claim 1, wherein measuring intensity of the recombined light at the first output is performed by a first photodetector and measuring intensity of the recombined light at the second output is performed by a second photodetector, each of the first and second photodetectors measure a two-dimensional image.

3. The method of claim 2 further comprising utilizing, by the electronic processor, a relationship between the two-dimensional images on a pixel-by-pixel basis to determine the presence of the gaseous chemical.

4. The method of claim 1 wherein the split received light with wavelengths outside the resonant wavelength range is recombined primarily with no phase difference at the first output and is recombined primarily with a one-half wavelength difference at the second output.

5. The method of claim 1 wherein the split received light with wavelengths inside the resonant wavelength range is recombined with substantial constructive interference at the second output and is recombined with substantial destructive interference at the first output.

6. The method of claim 1 wherein the split received light with wavelengths inside the resonant wavelength range is recombined substantially with no phase difference at the second output and is recombined substantially with a one-half wavelength phase difference at the first output.

7. The method of claim 1, wherein the received light has wavelengths within the infrared spectrum.

8. The method of claim 1, further comprising adjusting level of collimation, by a focusing optical system, of the received light.

9. The method of claim 1, wherein the first beamsplitter is utilized as the second beamsplitter.

10. The method of claim 1, wherein the light is received by viewing the ground from a position above.

11. The method of claim 1, further comprising optimizing detection sensitivity by altering concentrations of the gaseous chemical and a buffer gas inside the optical cell.

12. A gaseous chemical detector, the gaseous chemical detector comprising:

a first beamsplitter configured to split received wide band light onto a first path and a second path;

an optical cell on the first path containing a gaseous chemical having absorption features containing a resonant wavelength range, the optical cell configured to induce a phase shift in light with wavelengths inside the resonant wavelength range that passes through the optical cell;

a second beamsplitter at the end of the two paths configured to:
  recombine the received light at a first output and a second outputs, and
  induce a relative one-half wavelength phase difference between the split received light on the first and second paths recombined at the second output, light with wavelengths outside the resonant wavelength range being recombined with primarily constructive interference at the first output and recombined with primarily destructive interference at the second output;

a first photodetector configured to measure intensity of the recombined light at the first output;

a second photodetector configured to measure intensity of the recombined light at the second output, recombined light at the second output being substantially composed of light with wavelengths inside the resonant wavelength range; and an electronic processor configured to detect the presence of the gaseous chemical in the field of view based upon the intensity measured by the first photodetector and the intensity measured by the second photodetector.

13. The detector of claim 12, wherein at least of one the first and second photodetectors measures a two-dimensional image.

14. The detector of claim 13, wherein the electronic processor is further configured to utilize a relationship between the two-dimensional images on a pixel-by-pixel basis to determine the presence of the gaseous chemical.

15. The detector of claim 12 wherein the second beamsplitter is configured to:
recombine the split received light with wavelengths outside the resonant wavelength range primarily with no phase difference at the first output and primarily with a one-half wavelength difference at the second output.

16. The detector of claim 12 wherein the second beamsplitter is configured to:
recombine the split received light with wavelengths inside the resonant wavelength range with substantial constructive interference at the second output and substantial destructive interference at the first output.

17. The detector of claim 12, wherein the second beamsplitter is configured to:
recombine the split received light with wavelengths inside the resonant wavelength range substantially with no phase difference at the second output and substantially with a one-half wavelength phase difference at the first output.

18. The detector of claim 12, wherein the received wide band light has wavelengths in the infrared spectrum.

19. The detector of claim 12, further comprising a focusing optical system configured to adjust the level of collimation of the received light.

20. The detector of claim 12, wherein the first beamsplitter is also utilized as the second beamsplitter.

21. The detector of claim 12, further comprising an optical system configured to receive light by viewing ground from a position located above.

22. A method of filtering light, the method comprising:
receiving wide band light;
splitting, with a first beamsplitter, the received light onto a first path and a second path;
passing the split received light on the first path through an optical cell containing a gas with absorption features containing a resonant wavelength range;
inducing, by the optical cell, a phase shift in light with wavelengths inside the resonant wavelength range that passes through the optical cell;
recombining, with a second beamsplitter, the split received light on the two paths at an output; and
inducing a relative one-half wavelength phase difference between the split received light on the first and second paths recombined at the output, the split received light having a wavelength outside the resonant wavelength range being recombined primarily with destructive interference at the output.

23. The method of claim 22 wherein the split received light with wavelengths outside the resonant wavelength range is recombined primarily with a one-half wavelength phase difference at the output.

24. The method of claim 22 wherein the split received light with wavelengths inside the resonant wavelength range is recombined with substantial constructive interference at the output.

25. The method of claim 22, wherein the split received light with wavelengths inside the resonant wavelength range is recombined with substantially no phase difference at the output.

26. A light filter, the light filter comprising:
a first beamsplitter configured to split received wide band light onto a first path and a second path;
an optical cell, on the first path, containing a gas with absorption features containing a resonant wavelength range configured to induce a phase shift in light with wavelengths inside the resonant wavelength range that passes through the optical cell; and
a second beamsplitter configured to:
recombine the split received light at an output, and
induce a relative one-half wavelength phase difference between the split received light on the first and second paths recombined at the output, the split received light with wavelengths outside the resonant wavelength range being recombined primarily with a one-half wavelength phase difference at the output.

* * * * *

UNITED STATES PATENT AND TRADEMARK OFFICE
CERTIFICATE OF CORRECTION

PATENT NO. : 10,794,819 B2
APPLICATION NO. : 16/152809
DATED : October 6, 2020
INVENTOR(S) : Jonathan Ashcom and Sumanth Kaushik Page 1 of 1

It is certified that error appears in the above-identified patent and that said Letters Patent is hereby corrected as shown below:

In the Claims

In Claim 12, Column 16, at Line 14, delete "second outputs, and" and insert -- second output, and --.

Signed and Sealed this
Twenty-fourth Day of November, 2020

Andrei Iancu
*Director of the United States Patent and Trademark Office*